Figure 1:
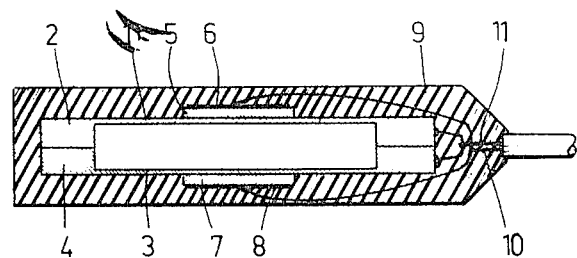
Figure 1A:
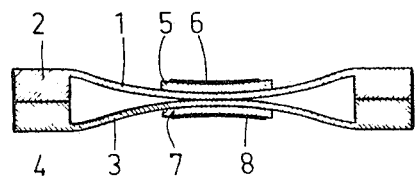

United States Patent [19] [11] 3,763,464
Laurent [45] Oct. 2, 1973

[54] PRESSURE TRANSDUCER DEVICE

[75] Inventor: Jean Laurent, Saint Germain en Laye, France

[73] Assignee: Institut Francois Du Petrole Des Carburants Et Lubrifiants, Hauts-de-Seine, France

[22] Filed: Jan. 11, 1972

[21] Appl. No.: 216,963

[30] Foreign Application Priority Data
Jan. 19, 1971 France .............................. 7101718

[52] U.S. Cl. ..................... 340/10, 310/8.2, 310/8.3, 340/12
[51] Int. Cl. ............................................. H04b 13/00
[58] Field of Search ...................... 340/8, 9, 10, 11, 340/12, 13, 14; 310/8.2, 8.3

[56] References Cited
UNITED STATES PATENTS
3,249,912  5/1966  Straube ................................ 340/10
3,368,193  2/1968  McQuitty et al. ..................... 340/10
3,166,730  1/1965  Brown, Jr. et al. .................... 340/10
2,436,377  2/1948  Briggs et al. ............................ 340/8
3,418,624  12/1968  Massa .................................... 340/9

Primary Examiner—Benjamin A. Borchelt
Assistant Examiner—H. J. Tudor
Attorney—Paul M. Craig, Jr. et al.

[57] ABSTRACT

Pressure transducer device comprising two flexible plates close to and facing each other and at least one pressure transducer element fastened to a plate on the side thereof opposite to the side facing the other plate, wherein at least one of the plates is provided with a rigid peripheral reinforced portion of a greater thickness than the central portion thereof, comprising a flat base against which the second plate is pressed, and wherein both plates are held in their relative positions by means of a tight acoustically transparent coating.

7 Claims, 4 Drawing Figures

PRESSURE TRANSDUCER DEVICE

This invention relates to a new very sensitive pressure transducer device of small size, adapted in particular to sense pressure waves in a liquid medium.

More particularly the invention relates to a pressure wave sensor making use, as sensitive element, of a piezoelectric material, responsive to flexion stresses.

Among the already known transducer devices, there can be mentioned those which include a pressure transducer sensitive element provided with two electrodes and secured to a flexible plate made solid on its periphery with a substantially stationary and rigid body or support. This support may also be used for limiting the distorsion of the plate when the pressure to be measured is liable to deteriorate the transducer device.

It is an object of this invention to provide a pressure transducer device which does not include such a rigid body or support and whose construction is accordingly more simple and less expensive.

The transducer device according to the invention comprises two flexible plates close to and facing each other and at least one pressure transducer element fastened to the rear side of the plate (opposite to that facing the other plate), at least one of the plates comprising a rigid reinforced peripheral portion of a greater thickness than the central portion and provided with a flat base against which the other plate is pressed.

Moreover, both plates, are held in their mutual position by means of an acoustically transparent sealing coating.

The two plates act mutually as a support. The construction of the transducer device does not require any fixed additional member for connecting and holding the two plates in their designed mutual position.

Figure 2:
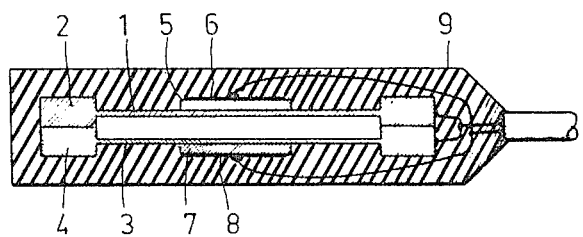
Figure 3:
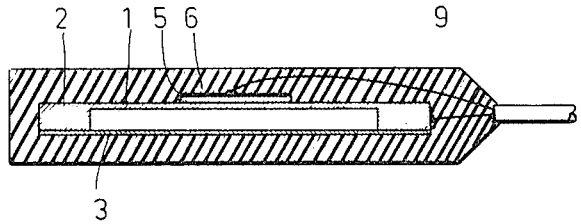

Other features and advantages of the transducer construction will be made apparent from the following description, given with reference to the accompanying drawings which illustrate non limitative embodiments of the invention. In these drawings :

FIG. 1 diagrammatically shows a first embodiment of the transducer device in which each of the two plates is associated to a pressure transducer element;

FIG. 1 A diagrammatically shows the positions of the two plates of the device of FIG. 1 when they are subjected to high pressures;

FIG. 2 diagrammatically shows a first alternative embodiment of the device of FIG. 1, and FIG. 3 shows a second alternative embodiment of this device in which only one of the two plates is provided with a pressure transducer element.

The devices of FIGS. 1 and 2 comprise two thin flexible circular plates 1 and 3 provided at their periphery with an annular reinforced portion, respectively 2 and 4. The thickness of these reinforced portions is noticeably greater than that of the plate central portion.

The two plates are pressed against each other along said reinforced portions.

On the rear sides of these plates are fastened pressure transducer elements 5 and 7 respectively provided with conducting layers 6 and 8 forming the external electrodes.

The plates 1 and 3 may be made entirely of metal and form the second electrode of each element 5,7. They mayalso be made partly of metal and partly of plastic material. In this latter case, for example, the second electrode of each transducer element will consist of a conducting layer deposited on a plate of insulating material, on the face thereof which is in contact with the transducer element.

In these different cases, the external electrodes 6 and 8 are connected to a common conductor 10 and the plates surfaces (1, 3) covered with a conducting layer, are connected to a common conductor 11.

Referring to FIG. 1 A, it is apparent that the arrangement of the device is such that it can withstand without damage high overpressures.

By the effect of the pressure, the plates 1 and 3 become incurved. After a given pressure has been reached, the central portions of the plates come into contact and press against each other. The thickness of the reinforced portions 2 and 4 is so selected that the distorsion of the plates, when they come into contact by the effect of the pressure, be not irreversible, i.e be kept in the range of the elastic distorsions.

The device shown in FIG. 3 comprises a single transducer element 5, provided with an external electrode 6 and associated to a flexible plate 1, identical to that of the described preceding embodiment and provided witha peripheral reinforced portion 2.

A flexible plate 12 takes its bearing on the peripheral portion 2 of plate 1.

A tight coating 9 holds the assembly in position.

From the foregoing description, one skilled in the art can easily ascertain the essential characteristics of the invention and, without departing from the spirit and scope thereof, can make various changes and modifications of the invention to adapt it to various usages and conditions. Consequently such changes and modifications are properly, equitably and intended to be within the full range of equivalence of the following claims.

What I claim is :

1. A pressure transducer device comprising two plates close to and facing each other, said plates having a central flexible portion, a pressure transducer element fastened to the central portion of at least one plate on the side thereof opposite to the side facing the other plate, the plate supporting the transducer element being provided with rigid peripheral reinforced portion of a greater thickness than the central portion thereof, and comprising a flat base against which the second plate is pressed, and a tight acoustically transparent coating for holding both plates in their relative positions and for insulating the pressure transducer device.

2. A pressure transducer device according to claim 1, in which the two plates comprise reinforced peripheral portions whose flat bases are pressed against each other.

3. A pressure transducer device according to claim 1, wherein the spacing of the plates is such that the maximum flexion thereof, when their central portions are pressed against each other by the effect of the applied pressure, is lower than the flexion which would result in an irreversible deformation of said plates.

4. A pressure transducer according to claim 1, wherein said two plates are formed entirely of metal.

5. A pressure transducer according to claim 1, wherein said two plates are formed partially of metal and partially of plastic material.

6. A pressure transducer according to claim 1, wherein the central flexible portions of said two plates are spaced from one another at a distance whereby said central flexible portions come into contact with one another at a predetermined pressure such that the maximum elastic distortion of the central portions will be reversible.

7. A pressure transducer according to claim 1, wherein a pressure transducer element is secured to the central portion of each plate on the side opposite the side facing the other plate.

* * * * *